May 5, 1942.　　　S. ROSENZWEIG　　　2,281,955
SHOCK PROOF ISOLATOR
Filed April 8, 1941　　　3 Sheets-Sheet 3

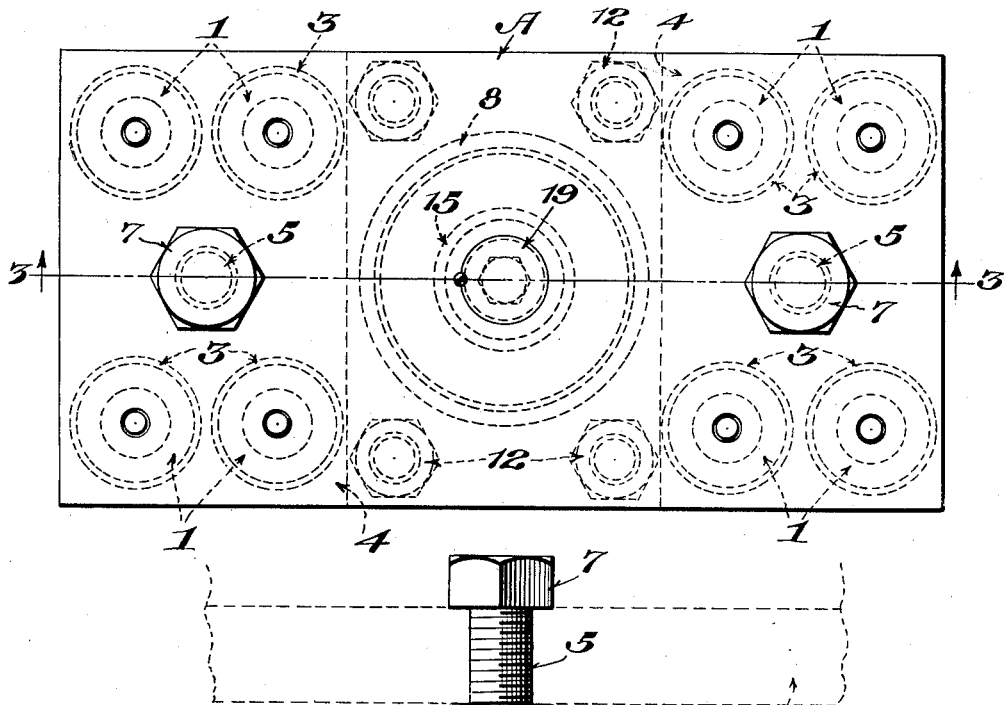
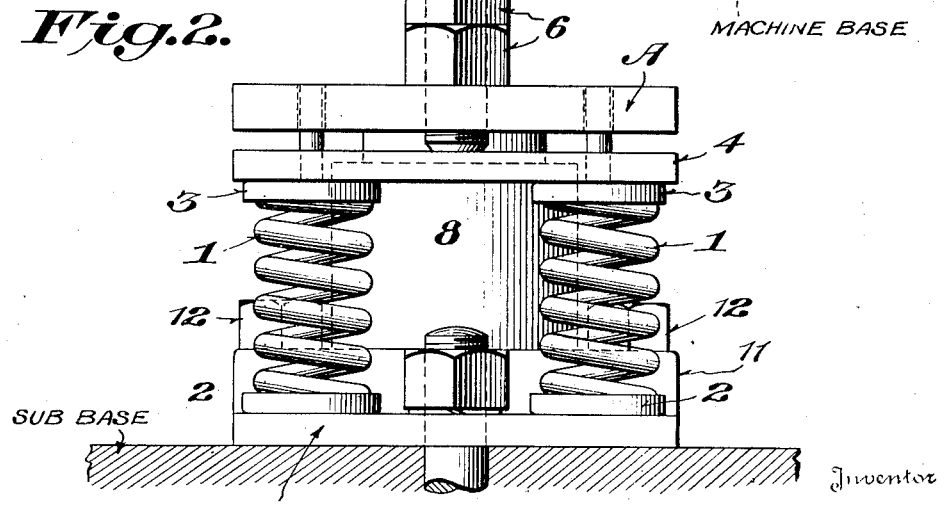

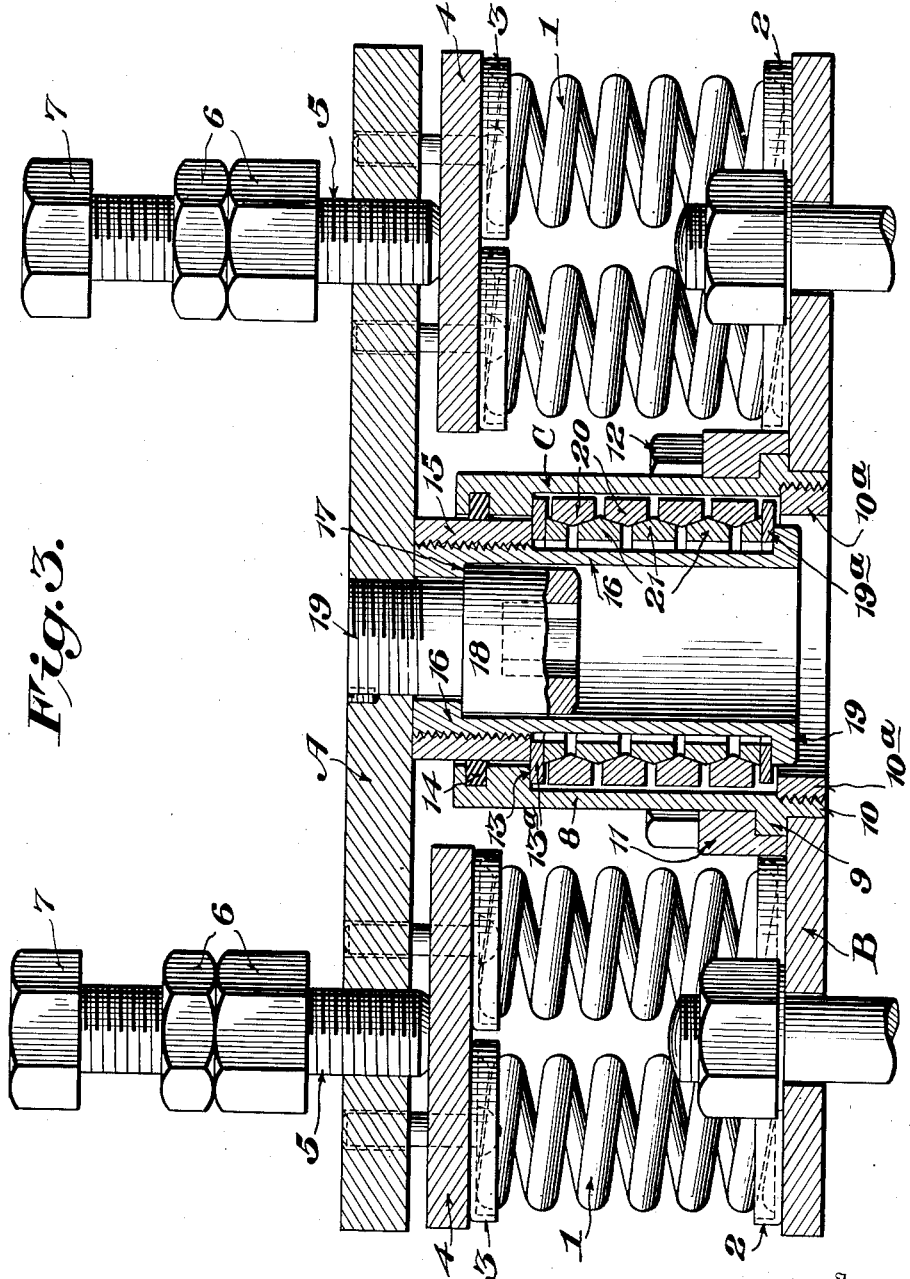

Inventor
S. Rosenzweig,
By Walhewster Groff
Attorneys

Patented May 5, 1942

2,281,955

UNITED STATES PATENT OFFICE 2,281,955

SHOCKPROOF ISOLATOR

Siegfried Rosenzweig, New York, N. Y.

Application April 8, 1941, Serial No. 387,483

7 Claims. (Cl. 248—20)

This invention relates to vibration isolators for machinery which are intended to prevent transmission of vibrations set up by an operating machine to a sub-base or foundation on which the machine is mounted, or, on the other hand, to isolate the machine itself from vibrations or shocks likely to be transmitted thereto from the sub-base.

One of the primary considerations underlying the present invention is to provide an isolator mounting for machinery which includes means for safeguarding the apparatus against destructive shock transmitted from above or below the location of the machine, that is in either an upward or downward direction. In particular, the invention is concerned with the protection of machinery mounted on spring isolators where a building or ship carrying the machine is likely to be subjected to the force of extraordinary shock caused by an explosion of bombs, mines, torpedoes, and the like, which set up an excessive disturbing factor in the building or vessel itself.

Experience indicates that on board a ship, for instance, under the explosion of a mine, torpedo, or shell fire, the shocks are so terrific that it is figured empirically to equal five times the static weight of the machine. Therefore, ordinarily, bumpers such as steel blocks, layers of rubber, or similar material, would be useless and the entire shock transmitted to the machinery or structure would cause its destruction. Therefore, it is necessary to provide means whereby this shock energy is absorbed slowly, relatively speaking, of course. The ordinary coil springs or flat steel springs are not suitable for this purpose because, having practically no internal dampening, they return all of the energy imparted to them. Felt and rubber, having a certain amount of internal dampening, would be more suitable, although the travel of compression required for these organic materials would be so great that their application would be cumbersome and perhaps impossible, particularly when installed on shipboard.

Accordingly, the object of the invention is to provide a vibration isolator, including a reliable device which will automatically function to prevent the isolating means from being compressed or extended considerably beyond its normal mechanical range upon the application of an excessive force from above or below the machine. More particularly, it is proposed to provide a combined isolator and a double-acting check device including ring springs, which device does not function within the normal mechanical range of the isolating medium, but only comes into play to check the effect of shock due to undesirable compression or extension of the isolating medium, thereby to permit functioning of the isolating means in the usual way.

Another object of the invention is to provide novel means for mounting the ring spring check device with relation to the machine and sub-base, and the isolating medium.

With the above and other objects in view which will more readily appear as the nature of the invention is better understood, the same consists in the novel combination and arrangement of parts hereinafter more fully described, illustrated and claimed.

A preferred and practical embodiment of the invention is shown in the accompanying drawings, in which:

Fig. 1 is a top plan view of an isolator embodying the present improvements.

Fig. 2 is an end elevation of the construction shown in Fig. 1.

Fig. 3 is an enlarged vertical cross-sectional view taken on the line 3—3 of Fig. 1.

Similar reference characters designate corresponding parts throughout the several figures of the drawings.

Figure 4:
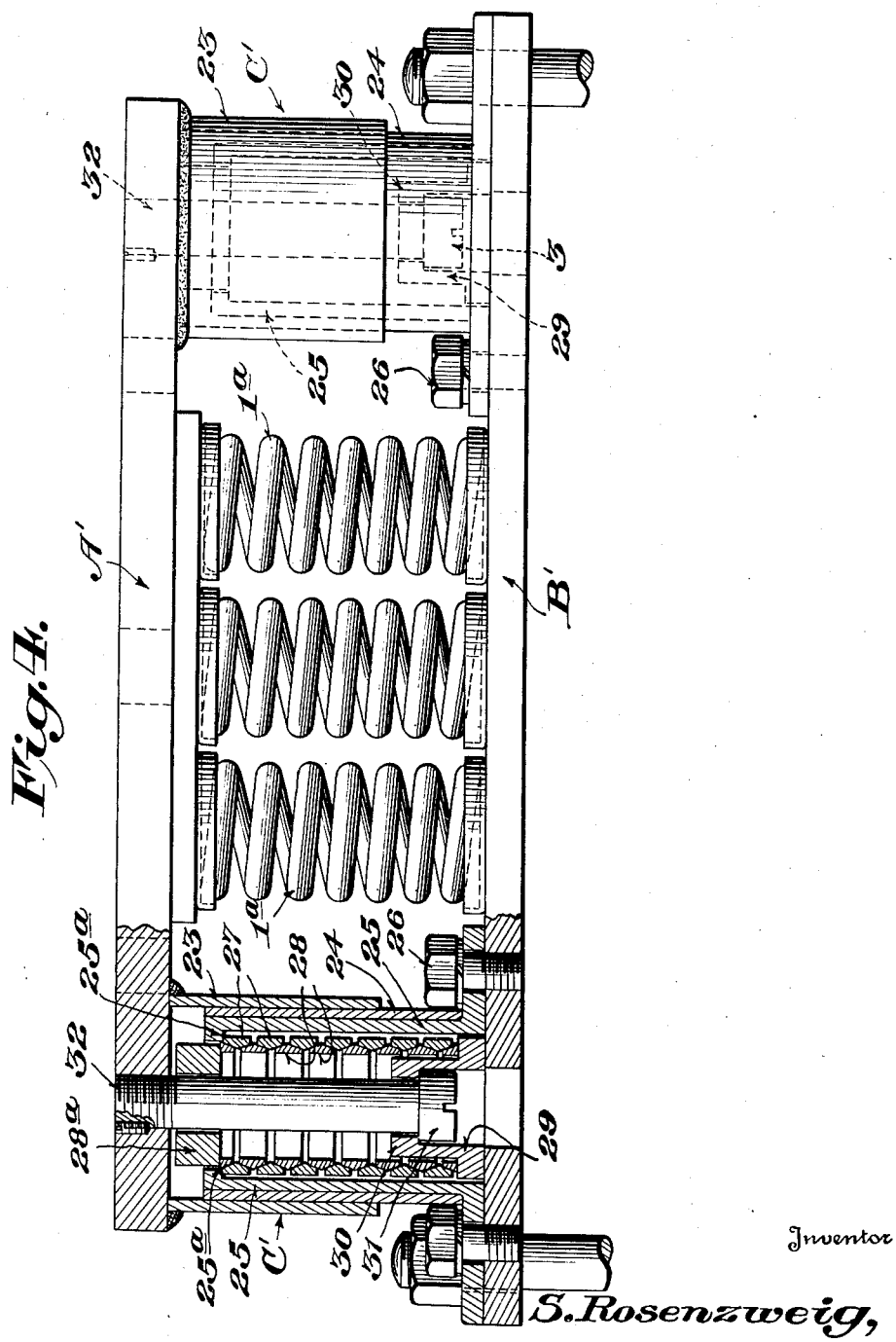
Fig. 4 is a side elevation, partly in section, showing a modified arrangement of isolator springs and checking devices.

Referring to the embodiment of the invention shown in Figs. 1 to 3, it will be observed that the vibration isolator includes top and bottom plates respectively designated as A and B, the former constituting the machinery support and the latter being intended to be secured to a sub-base or foundation in a building, vessel, or the like.

Between the top and bottom plates A and B there is provided a plurality of isolator elements which may be of cork, or other resilient material, but are preferably in the form of steel springs 1 having a predetermined mechanical range for the purpose of normally supporting or sustaining the machine, so as to absorb the predetermined range of disturbing frequencies ordinarily generated by the machine itself or likely to be transmitted to the machine from the sub-base. These isolator springs are preferably mounted in suitable sockets 2 on the bottom plate B, while their upper ends are likewise mounted in sockets or cups 3 carried by adjusting straps 4. These straps 4 may be moved axially of the isolator springs by the screws 5 having the nuts 6 and 7, which not only serve to anchor the machine to the top plate but also function as lock nuts to set the position of the straps 4 in its properly adjusted position.

The said top and bottom plates A and B are connected by a novel double-acting check device designated generally as C. This check device is preferably in the form of a double-acting ring spring construction and is so arranged and adjusted as not to interfere with the functioning of the isolator spring 1 under normal conditions. In other words, the double-acting check device C is intended only to come into operation when an unusual or excessive force is applied to either the machine on the top plate A or the sub-base on which the bottom plate B rests. In that connection it is preferred to use the double-acting check device of the ring spring type for the reason that a device of this character is exceedingly durable and will last the life of the installation, especially since it may function only at rare intervals. That is to say, a ring spring check device, including all metallic parts, is preferable to check devices utilizing rubber or other elastic mediums which are likely to deteriorate, and is also preferable to a check device using a fluid, such as oil, which is difficult to service, and at the same time offers undesirable fire hazards, as well as uncertainty of operation, especially if it has been installed over a long period of time.

Referring more specifically to the check device C shown in Figs. 1 to 3, it will be observed that the same includes in its organization an outer casing 8 provided on the outer face of its lower end with a shoulder 9 for engaging an edge of the plate B about a suitable opening therein into which the internally threaded sleeve portion 10 of the casing projects. This sleeve is adapted to adjustably receive an externally threaded abutment ring 10a. The outer casing or housing 8 is held on the plate B by a suitable clamping ring 11, bolted or otherwise secured to the plate B by the bolts 12. The upper inner end of the casing 8 is preferably of reduced diameter to provide an interior spring abutment shoulder 13, and, as will be seen from Fig. 3, the said portion of reduced diameter may be provided with a groove for receiving a packing ring 14 which engages the outer wall of an annular adjusting sleeve 15. This adjusting sleeve 15 is preferably interiorly threaded to adjustably engage the threaded outer surface of an inner tubular casing or housing element 16. The said casing element 16 is provided with an interior shoulder 17 adapted to be engaged by the under side of the head 18 of a screw 19 intended to be threadedly secured to the top plate A. The inner casing 16 extends downwardly of the assembly to a point where its lower end is provided with an outwardly extending flange 19 which also constitutes an abutment for the inner set of ring springs presently to be described.

From the foregoing description of the casings or housings 8 and 16 it will be apparent that the former includes the spring abutments 10a and 13, one of which is adjustable relative to the other, and likewise the casing 16 includes the spring abutments 15 and 19 which are relatively adjustable.

The annular space defined by the casings 8 and 16 is intended to receive and house a set of outer ring springs 20 which are intended to cooperate with a series of inner ring springs 21. The inner faces of both the outer and inner ring springs are beveled or inclined to complementally engage in such a way that the springs of each set or stack are spaced apart, and the application of a force to one set of springs, while the other is backed up by an abutment causes radial compression of the inner springs and radial stretching of the outer springs. As will also be observed from Fig. 3, the elastic ring springs 20 and 21 do not directly engage the abutment 13—15 and 10a—19, but preferably engage suitable annular washers or shims 13a and 19a respectively, which in turn directly engage the abutments 13—15, and 19.

In the arrangement shown in Fig. 3 it will be apparent that the top and bottom plates A and B of the isolator, having the isolator springs 1 therebetween, are connected by the double-acting check device C through the medium of the housings 8 and 16 and the stacks of elastic or spring rings 20 and 21. It will be observed that the inner edge of the abutment ring 10a is spaced from the related face of the abutment washer 19a so as to provide a predetermined amount of play or travel during which the rings 20 and 21 will not function, thereby to permit the isolator springs 1 normally to compress and elongate to take care of the disturbing frequencies set up by the machine, or through the sub-base. Assuming, however, that an extraordinary or excessive force is transmitted to the machine or to the sub-base, it will be apparent that the ring spring device will function. That is to say, if the extraordinary force is applied in the direction of the plate A, the inner casing 16 of the check device, since it is carried by the plate A, will descend and carry the sleeve 15 with it. Sleeve 15 will entrain the inner ring springs 21 and the outer ring springs 20 and thereby cause successive compression and stretching of the inner and outer rings until the lower washer 19a engages the abutment ring 10a, when the maximum compression and stretching of the rings 20 and 21 will occur and cushion the isolator springs before they can exceed the compressive limit of their mechanical range. So much energy is used up in the compression of the ring spring that only a comparatively small residual force manifests itself when the unusual force has ceased to exist. However, when the excessive force disappears, and if the plate A moves upwardly, the ring springs 20 and 21 will release and the casing or housing 16 carried by the top plate A will cause the abutment shoulder 19 thereof to entrain the inner elastic rings 21 and the outer elastic rings 20 and force them against the abutment shoulder 13 through the medium of the washer 13a, thus checking excessive extension of the isolator springs.

If the excessive force originates from the sub-base through the bottom plate B, the abutment 10a will engage the washer 19a and cause the inner and outer ring springs to engage with the ultimate stopping effect being caused by washer 13a engaging abutment 13 of outer housing 8.

According to the embodiment of the invention illustrated in Figs. 1 to 3, the check device C is shown as located centrally of the various sets or pairs of isolator springs 1. However, as will be apparent from Fig. 4, the number and arrangement of check devices with respect to the isolator springs may be varied according to different installations.

As shown in Fig. 4, isolator springs 1a are arranged centrally of top plate A' and bottom plate B', while the check devices C' are located outwardly of the isolator springs and may be used in any number or quantity in this relation to the isolator springs, according to the particular specification involved.

Fig. 4 of the drawings illustrates a slightly modified form of check device C', which, however, functions in the same manner as the device C, so that it is only necessary to call attention to the structural differences between the two. As will be seen from Fig. 4, the check device includes an outer cylindrical casing or housing 23 welded or otherwise secured at its upper end to the top plate A' and adapted to telescopically receive the cylindrical spacing sleeve 24 as well as the cylindrical inner casing 25 which is bolted or otherwise secured to the base plate B' by the bolts 26.

The outer and inner ring springs 27 and 28, having reversely inclined mating faces, are arranged within the inner cylinder 25 which is secured to the bottom plate B'. The outer ring spring 27 at the top of the stack engages the shoulder 25a on the outer cylinder 25, and the inner ring spring 28 at the bottom of the stack engages with the flanged head 29 of the cup-like abutment device 30 which is anchored to the top plate A' by the head 31 of the relatively long shanked screw bolt 32. When an excessive force is applied in the direction of the plate A', which will tend to collapse the isolator springs 1a, the annular abutment 28a surrounding the shank of the bolt 32 will be engaged by the underside of the top plate A' and depress the inner ring 28 at the top of the stack to progressively entrain the inner and outer ring springs 27 and 28, since the inner ring 27 at the bottom of the stack rests on the shoulder 29 which is backed up by the upper face of the bottom plate B'. When the unusual force is released and the plates A' and B' tend to separate, the abutment shoulder 29 will likewise progressively entrain the outer and inner ring springs 27 and 28 and force the outer ring 27 at the top of the stack into engagement with the annular shoulder 25a. It will, of course, be understood that the top of the abutment 28a is normally spaced an appropriate distance below the underside of the top plate to provide sufficient clearance to permit of the normal operation of the isolator springs.

In both forms of the invention, the check devices C and C' are double-acting in the sense that they take care of excessive force tending to collapse the isolator springs and, on the other hand, also prevent an excessive separating movement between the top and bottom plates of the isolator when the force is released. In both cases it is preferred to so construct the check devices C and C' that they will preferably function only under extraordinary circumstances. In other words, the isolator springs are intended to be left free to perform their normal function under ordinary conditions but will be adequately protected against forces which would tend to destroy the apparatus or machinery mounted on the isolator.

It will, of course, be understood that while the check device C may be directly incorporated in the isolator unit itself, as shown, nevertheless, the same results can be accomplished by using a plurality of isolator units including only the isolator springs whose confining plates are respectively secured to the machine base and sub-base or foundation, while the check device is also anchored or secured respectively to the machine base and the sub-base. In both cases the objects and functions are the same, and the present invention is intended to cover an installation or specification where this contingency may arise.

I claim:

1. A machinery vibration isolator including, in combination, a bottom plate and a machinery supporting top plate, spring isolators having a predetermined mechanical range confined between the top and bottom plates for yieldingly supporting the machinery on said top plate under normal operating conditions, and a device connecting said plates for checking excessive applied forces tending to compress or extend the springs beyond said predetermined mechanical range, said device comprising an outer casing carried by the bottom plate and having internal ring spring abutments, and an inner cylindrical casing secured to the top plate and having upper and lower ring spring abutments spaced closer together than the abutments of the outer casing, and a plurality of frictionally interengaged ring spring devices confined between said abutments of the inner casing.

2. A machinery vibration isolator including, in combination, a bottom plate and a machinery supporting top plate, spring isolators having a predetermined mechanical range confined between the top and bottom plates for yieldingly supporting the machinery on said top plate under normal operating conditions, and a device connecting said plates for checking excessive applied forces tending to fully compress or extend the springs beyond their predetermined mechanical range, said device comprising an outer casing carried by the bottom plate and having internal annular abutments, one of which is adjustable relative to the other, an inner cylindrical casing secured to the top plate and having upper and lower ring spring abutments, one of which is also adjustable relative to the other, and which abutments are normally spaced closer together than the said ring spring abutments on the outer housing, and a plurality of frictionally interengaged ring spring devices confined between the said abutments of the inner casing and adapted to cooperate with the abutments of the outer casing upon the transmission of an excessive force to the isolator.

3. A machinery vibration isolator including, in combination, a bottom plate and a machinery supporting top plate, spring isolators having a predetermined mechanical range confined between the top and bottom plates for yieldingly supporting the machinery on said top plate under normal operating conditions, and a device connecting said plates for checking excessive applied forces tending to fully compress or extend the springs, said device comprising an outer casing secured at its lower end to the bottom plate and having an interior abutment at its upper end, a cup-like inner casing having an outer flange whose inner face constitutes a ring spring abutment and also having an inwardly projecting flange presenting a shoulder, a headed screw bolt having a relatively long shank whose head portion engages with said shoulder and whose shank extends upwardly to engage in the top plate, an annular abutment surrounding the shank of the screw adjacent the top plate and normally spaced therefrom, inner and outer stacks of double-acting ring springs, the inner rings being confined between the annular abutment and the abutment provided by the outwardly projecting flange on the inner cup-like casing, and the topmost ring of the outer stack engaging the inwardly projecting abutment of the outer casing, and a housing carried by the top plate for telescopically receiving the outer casing carried by the bottom plate.

4. In a machinery vibration isolator, the combination, including, a pair of plates, isolator springs between said plates having a predetermined mechanical range for absorbing and preventing the transmission of a predetermined range of disturbing forces of a machine to or from its foundation, and normally inactive shock absorbing means connecting said plates, said means comprising an abutment carried by one of the plates, inner and outer sets of ring springs having inclined inner faces adapted to be disposed in wedging contact, and means carried by the other of said plates for supporting said sets of ring springs, the end of said sets of ring springs adjacent said abutment being spaced therefrom when the isolator is loaded to permit the isolator springs to function within their normal mechanical range, and the end of said sets of ring springs adjacent the abutment being adapted to contact therewith upon the transmission of extraordinary force to the isolator thereby to prevent excessive compression or extension of the isolator springs beyond their normal mechanical range.

5. In a machinery vibration isolator, the combination, including, a pair of plates, isolator springs between said plates having a predetermined mechanical range for absorbing and preventing the transmission of a predetermined range of disturbing forces of a machine to or from its foundation, and normally inactive shock absorbing means connecting said plates, said means comprising inner and outer casings respectively carried by the upper and lower plates and each provided with spaced internal opposed abutments, inner and outer sets of ring springs having inclined inner faces disposed in wedging contact and confined between the abutments to said inner casing, the distance between the abutments of the outer casings being greater than the distance between the abutments of the inner casing, to provide a clearance when the isolator is loaded to permit the isolator springs to be operative within their effective mechanical range, and said sets of ring springs being adapted to engage either of the abutments on the outer casing when the isolator is subjected to excessive load in the direction of either the top or bottom plate, thereby to prevent the isolator springs from being extended or compressed beyond their normal mechanical range.

6. In a machinery vibration isolator, the combination, including, a pair of plates, isolator springs between said plates having a predetermined mechanical range for absorbing and preventing the transmission of a predetermined range of disturbing forces of a machine to or from its foundation, and normally inactive shock absorbing means connecting said plates, said means including an element carried by one of said plates and supporting a resilient unit comprising inner and outer sets of double acting ring springs, an element carried by the other of said plates and having abutments spaced apart a greater distance than the normal length of the resilient unit to provide space for permitting normal action of the isolator springs and whereby the ring springs of said unit are inoperative within the effective mechanical range of said isolator springs but automatically function under excessive loading of the isolator springs to prevent the same from being compressed or extended beyond their normal mechanical range.

7. A machinery vibration isolator, comprising, in combination, a bottom plate and a machinery supporting top plate, isolator springs having a predetermined mechanical range confined between the top and bottom plates for yieldingly supporting a machine mounted on said top plate, shock absorbing means arranged between said plates and including friction elements having opposing friction faces and operatively connected with one of the plates, and abutment means carried by the other of said plates and positioned to provide a space between the same and said friction elements when the isolator is loaded so as to render said friction elements normally inactive within the effective mechanical range of the spring isolators, said friction elements and abutment means operatively engaging upon the closing of said space by the transmission of a sudden impact to the isolator in excess of the capacity of the said isolator springs to prevent the same from being compressed or extended beyond their normal mechanical range.

SIEGFRIED ROSENZWEIG.